June 30, 1953  M. BUDISH  2,643,455
ARTIFICIAL TEETH
Original Filed Dec. 17, 1949

INVENTOR.
MELVIN BUDISH
BY Charles R. Fay, atty.

Patented June 30, 1953

2,643,455

UNITED STATES PATENT OFFICE 2,643,455

ARTIFICIAL TEETH

Melvin Budish, Worcester, Mass.

Original application December 17, 1949, Serial No. 133,528. Divided and this application August 15, 1951, Serial No. 241,919

2 Claims. (Cl. 32—8)

It has been recognized that in making false teeth, it is advantageous to make the teeth resemble natural teeth as closely as possible, natural teeth almost always having imperfections, discolorations, striations, etc., and it will be seen that it would be fairly simple merely to mold false teeth of a single suitable material, but that it is a completely different and more difficult proposition to provide the same with discolorations, striations and transparent tips as natural teeth almost always have, without making the teeth substantially by hand and individually.

It is the principal object of the present invention to provide artificial teeth having transparent tips and striations so that the teeth are very natural in appearance and do not cost any more than ordinary false teeth which do not imitate natural teeth as to imperfections.

A further object of the invention includes the provision of extremely natural looking teeth having transparent tips, completely covered with transparent enamel, and each tooth having a narrow streak or ridge extending more or less centrally of the tooth to the very tip edge thereof at the transparent portion, said streak or ridge being completely embedded.

Other objects and advantages of the invention will appear hereinafter.

This application is a division of Serial No. 133,528, filed December 17, 1949, now Patent No. 2,566,652.

Reference is to be had to the accompanying drawings in which

Figure 1:
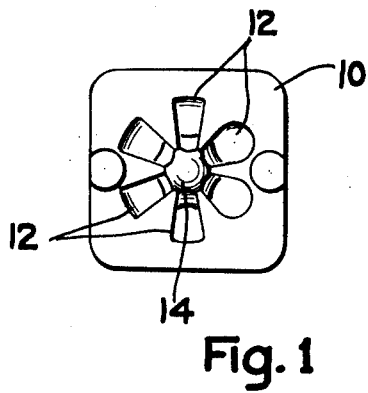
Fig. 1 is a top plan view of the first or base molding die piece.

As shown in Fig. 1, there is a die piece 10 which is provided with a series of cavities 12 and a central raised portion 14. The cavities 12 are made to represent the backs or lingual aspects of the teeth to be molded.

Figure 2:
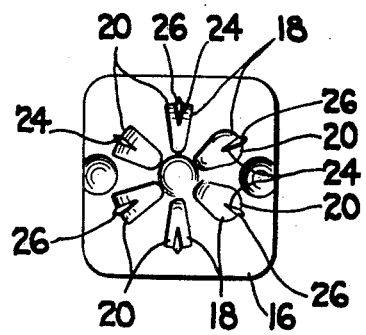
Fig. 2 is a top plan view of the intermediate or trimming die piece.
Figure 3:
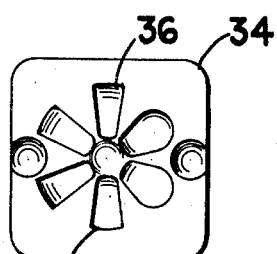
Fig. 3 is a top plan view of the final molding piece.
Figure 4:
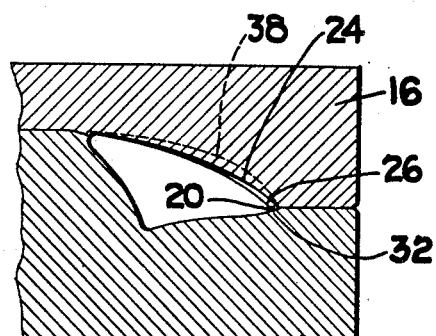
Fig. 4 is an enlarged section through the first and second die pieces when fitted together.
Figure 5:
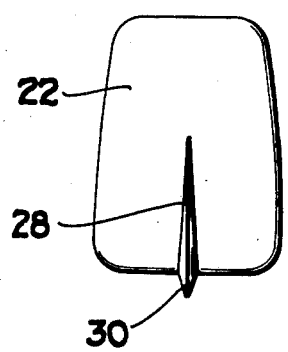
Fig. 5 is an enlarged view of a preliminarily molded tooth.

In Fig. 2 there is shown the intermediate trimming die piece 16 which is provided with a like number of cooperating cavities 18 so that when die part 16 is turned over on die part 10, it will mold the preliminary teeth. However, the cavities 18 are shorter than the cavities 12 and are provided with relatively sharp trimming edges 20 perhaps best seen in Fig. 4 which fit very slightly down into the extreme end of cavities 12 and prevent the latter from filling up with the molding material so that the resultant blank or preliminary tooth 22 as shown in Fig. 5 is shorter than the final tooth as will appear hereinafter.

At the same time the die part 16 cavities are provided with elongated central depressions 24 which extend outwardly of the cavities 20 as indicated at 26 so that the preliminary molded tooth 22 has a ridge 28 thereon and an outwardly extending ridge point 30.

The die part 16 being removed from die part 10, the so far described preliminarily molded teeth are left in the cavities of die part 10 and a transparent enamel material in plastic form is applied to the tips thereof as at 32 in sufficient quantity to extend over the entire teeth when the final die part 34 is applied thereto and pressed down thereon, and the molded material is then cured. The depths of the cavities 18 and die part 16 are a little bit less than the depths of the cavities 36 in the die part 34 as well as being shorter so that the transparent enamel material spreads over the entire labial aspects of the teeth as indicated in dotted lines at 38 in Fig. 4 providing the entire tooth with an enamel surface and a transparent tip 40 which tip is more or less the same in length as the extending point 30 of ridge 28. However, it is to be clearly understood that even though the tip 40 is referred to as transparent, it is graduated to translucidity because of the shape of the molds from the biting edge upwardly and, of course, the thicker the tooth gets, the less the degree of transparency since the enamel although transparent is not glass-like but has a little color in it.

Figure 6:
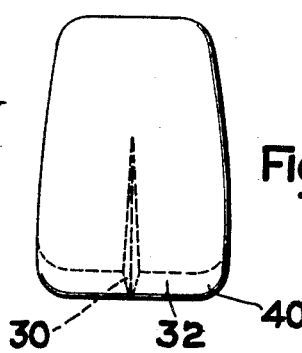
Fig. 6 is an enlarged front view of the completed tooth.

At the same time the tip 30 of ridge 28 is clearly apparent in the finished tooth in Fig. 6, but it appears to taper off upwardly as it is reduced in height toward the root of the tooth.

It will be seen that this invention provides natural looking teeth. The degree of transparency of the tip is always exactly uniform because the trimming die 16 always insures a definite relation for this tip due to the fact that it always cuts off the same amount of material at the point 20, see Fig. 4.

Figure 7:
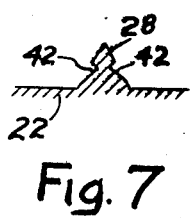
Fig. 7 is an enlarged section through a modified tooth.

In Fig. 7 there is shown an enlarged tooth 22 with the ridge 28, but in this case the ridge is undercut at 42, thus providing additional but fainter lines in the finished tooth. The material of which the tooth is made is soft enough when the mold is opened to mold these undercuts in and still remove the mold parts without damaging the ridge.

Having thus described my invention and the advantages thereof, I do not wish to be limited to the details herein disclosed otherwise than as set forth in the claims, but what I claim is:

1. A false tooth comprising a short base portion having an integral ridge at the labial aspect thereof and a layer of enamel covering the said labial aspect and the ridge, said ridge extending beyond the incisal edge of the base portion and being substantially co-terminous with the incisal edge of the enamel layer.

2. A false tooth comprising a short molded tooth-shaped base portion, an integral molded ridge on the labial aspect thereof, said ridge being substantially centrally located and running longitudinally of the base portion, and a covering of translucent enamel over the base portion and completely covering the ridge, the ridge extending well beyond the incisal edge of the base portion and the enamel extending therebeyond also to complete the covering of the ridge by the enamel.

MELVIN BUDISH.

References Cited in the file of this patent

UNITED STATES PATENTS

| Number | Name | Date |
|---|---|---|
| 2,302,375 | Myerson | Nov. 17, 1942 |